(12) United States Patent
Guardiola et al.

(10) Patent No.: US 12,132,372 B2
(45) Date of Patent: Oct. 29, 2024

(54) STATOR ARRANGEMENT OF AN ELECTRIC MOTOR WITH CONNECTOR UNIT

(71) Applicant: NIDEC MOTORS & ACTUATORS (GERMANY) GMBH, Bietigheim-Bissingen (DE)

(72) Inventors: Pascual Guardiola, Ingersheim (DE); Uwe Lasebnick, Stuttgart (DE)

(73) Assignee: NIDEC MOTORS & ACTUATORS (GERMANY) GMBH, Bietigheim-Bissingen (DE)

( * ) Notice: Subject to any disclaimer, the term of this patent is extended or adjusted under 35 U.S.C. 154(b) by 293 days.

(21) Appl. No.: 17/725,740

(22) Filed: Apr. 21, 2022

(65) Prior Publication Data

US 2022/0344999 A1    Oct. 27, 2022

(30) Foreign Application Priority Data

Apr. 21, 2021    (DE) ..................... 10 2021 110 062.3

(51) Int. Cl.
*H02K 3/52*    (2006.01)
(52) U.S. Cl.
CPC ......... *H02K 3/522* (2013.01); *H02K 2203/09* (2013.01)
(58) Field of Classification Search
CPC ............... H02K 3/522; H02K 3/28; H02K 3/50; H02K 3/505; H02K 3/521; H02K 2203/09; H02K 2203/06
See application file for complete search history.

(56) References Cited

U.S. PATENT DOCUMENTS

| 6,924,570 B2 | 8/2005 | De Filippis |
| 8,841,813 B2 | 9/2014 | Junak |
| 10,404,125 B2 * | 9/2019 | Nakahara ............... H02K 1/146 |

(Continued)

FOREIGN PATENT DOCUMENTS

| DE | 102009022899 A1 | 12/2010 |
| DE | 102016225170 A1 | 6/2018 |

(Continued)

OTHER PUBLICATIONS

Machine Translation of DE_102019215679_A1 (Year: 2021).*
Machine Translation of JP_2019037132_A (Year: 2019).*

*Primary Examiner* — Quyen P Leung
*Assistant Examiner* — Charlie Frank Mann, Jr.
(74) *Attorney, Agent, or Firm* — LUCAS & MERCANTI, LLP; Klaus P. Stoffel

(57) ABSTRACT

A winding pack for a stator assembly of an electric motor, including a coil assembly having twelve coils arranged in three groups, each having four coils of a winding, which are interleaved circumferentially. Each group has two pairs of adjacent coils, between which two pairs of the other groups are positioned. All groups have an identical sequence of their winding direction. Each pair contains both winding directions, the order of which differs between the two pairs. The technical winding start coming from one of the terminal regions in the pair that is first when viewed in the circumferential direction and the technical winding end leading to one of the terminal regions in the second pair of the relevant group are located, in relation to the winding pack, at the end face and on the side of the relevant second coil of the pair facing the first coil of this pair.

14 Claims, 4 Drawing Sheets

(56) References Cited

U.S. PATENT DOCUMENTS

| | | | |
|---|---|---|---|
| 11,075,562 B2 | 7/2021 | Yamashita | |
| 11,165,303 B2 | 11/2021 | Wiethoff | |
| 11,277,047 B2 | 3/2022 | Murakami | |
| 2002/0130578 A1 | 9/2002 | Anma | |
| 2013/0043749 A1 | 2/2013 | Nonoguchi | |
| 2018/0309340 A1 | 10/2018 | Ogawa | |
| 2019/0386535 A1* | 12/2019 | Shiraishi | H02K 1/146 |
| 2020/0059127 A1* | 2/2020 | Yamashita | H02K 3/522 |

FOREIGN PATENT DOCUMENTS

| | | | | |
|---|---|---|---|---|
| DE | 112016004717 T5 | 7/2018 | | |
| DE | 112018001667 T5 | 12/2019 | | |
| DE | 102020104001 A1 | 10/2020 | | |
| DE | 102019215679 A1 * | 4/2021 | | |
| EP | 1526628 A1 | 4/2005 | | |
| EP | 2483991 B1 | 11/2014 | | |
| JP | 2010183662 A | 8/2010 | | |
| JP | 2019037132 A * | 3/2019 | | H02K 3/28 |
| WO | WO-2021049128 A1 * | 3/2021 | | H02K 1/165 |

\* cited by examiner

STATOR ARRANGEMENT OF AN ELECTRIC MOTOR WITH CONNECTOR UNIT

CROSS-REFERENCE TO RELATED APPLICATIONS

The present application which claims priority of DE 10 2021 110 062.3, filed Apr. 21, 2021, the priority of the application is hereby claimed and this application is incorporated herein by reference.

BACKGROUND OF THE INVENTION

The invention relates to a stator assembly of an electric motor, comprising a winding pack and a connector unit. The winding pack contains twelve coils in the form of stator coils. The stator assembly is part of the stator of the electric motor.

EP 2 483 991 B1 discloses an electric motor in the form of a brushless synchronous motor comprising ten rotor-side and twelve stator-side poles in the form of wound coils. Winding the coils is a time-consuming process. In addition, the coils need to be correctly wired in order to obtain a functioning motor.

It is known from EP 1 526 628 that this kind of wiring is very time-consuming. This document proposes implementing this using an electrical wiring unit comprising connector rings ("busbar unit"). The wiring unit is also a complex component.

The coils form at least part of a winding pack. The winding pack together with the wiring unit forms the stator assembly.

SUMMARY OF THE INVENTION

The object of the present invention is to propose improvements to a stator assembly.

This object is achieved by a winding pack according to claim 1 for a stator assembly of an electric motor. Preferred or advantageous embodiments of the invention and other invention categories are found in the remaining claims, the following description, and the accompanying drawings.

The winding pack contains three windings, and each of the windings contains a coil group (or "group" for short) made up of four coils in two pairs. The winding is produced by a conductor, in particular a winding wire, which does not necessarily have to be designed in one piece or uninterruptibly. The winding can therefore also comprise electrically connected parts that are separate from one another. The coil group is connected to the terminal regions by feed portions. The coils are connected to one another within the coil group by transition lines within the pairs and connection lines between the pairs.

The winding pack contains three terminal regions. Each of the terminal regions is used to connect the winding pack or feed portions to one of three phases of a three-phase voltage or current (always referred to as a "three-phase voltage" in the following for the sake of simplicity). These phases of the three-phase voltage are denoted by "U, V, W" in the following. The terminal regions are each unipolar terminal points in the electrical sense, but are spatially spread-out regions in which the respective ends and/or starts of the windings (feed portions) in a coil group can be electrically contacted. The terminal regions are imaginary spatial regions here. The specific electrical connection is produced by electrical conductors, in particular phase collectors, which electrically guide the windings to three terminals or electrically contact said windings. During operation, each of the three terminals is then connected to one phase or supplied with power thereby.

The winding pack has a longitudinal axis, which, in this case, is assigned an arbitrary but fixed direction, namely from the "bottom" to the "top". For selecting directions, winding directions, numbering, etc. (see below), the following is applicable in the present case: Here, a specific direction/designation/term is selected in each case in order to consistently explain the relationships. A different term (e.g. the "bottom" being referred to as the "top") or selecting all the designations would be possible, but only as long as the present consistency of the relationships was not altered. In this respect, the specific term used for designations, directions, etc., seems to remain insignificant.

In this respect, the winding pack has a lower and an upper end face. The winding pack contains a coil assembly, which is arranged concentrically with or in the circumferential direction around the longitudinal axis. The coil assembly contains twelve coils, which are evenly distributed around the longitudinal axis in the circumferential direction. The circumferential direction is also assigned an arbitrary but fixed direction here, which extends counter to what is known as the "right-hand rule" here. If the thumb extended on a human right hand is oriented in the direction of the longitudinal axis, the four curled fingers on that hand point in a circumferential direction around the longitudinal axis, and the direction selected here points in the opposite direction. "Evenly distributed" means that the coils are each offset from one another by 30° in the circumferential direction.

The coils are stator coils, with each of the coils being oriented radially with respect to the longitudinal axis of the stator assembly. This means that each coil or its winding (as part of the entire winding of the group) delimits a surface of which the surface normal extends in the radial direction with respect to the longitudinal axis. All the coils are thus oriented concentrically in the circumferential direction with respect to the longitudinal axis and have the same radial spacing from the longitudinal axis, and are therefore distributed around the longitudinal axis on a concentric circle. In the winding pack, the coils together form (gaps etc. are excluded here) or follow a straight circular cylinder, with the individual windings being positioned on or following the cylinder surface.

All the coils have the same winding geometries, except for two different winding directions. Possible winding directions are "clockwise" (CW) or "counterclockwise" (CCW). In this case, the counting direction is determined as follows: it relates to an unraveled winding pack that has been unwound, unrolled or laid out from the longitudinal axis onto the plane of the paper: in this case, the direction "top" also relates to the top of the plane, "left" is to the left, etc. The winding pack is unraveled at an arbitrary but fixed point between two coils. The radial inner face of the winding pack is therefore facing the viewer. The circumferential direction of the winding pack then points from left to right in the plane of the paper, and therefore the "bottom" and "top" end faces also retain their meaning on the plane of the paper. What is being discussed here is only the technical winding direction, i.e. the manner in which a winding is physically produced, in particular attached to a core or coil core that is not explained in greater detail. Only selecting the current-feed direction during operation would result in the electrical winding direction, which cannot be observed here. In order to explain the winding pack, the coils are numbered from left to right with the numbers "1" to "12" in the wound state on the plane of the paper.

Except for a different winding direction, the coils are therefore wound identically, have the same dimensions and the same number of windings. In any case, there are differences in introducing the coil wire to and leading it away from the winding, i.e. identical winding geometries can, when viewed in a wrapping direction of a winding around the core, start and end at different circumferential wrapping positions, e.g. at the "bottom" or "top", or on the "left" or "right", in the winding pack. The start and end of the winding, i.e. the entry and exit point for a winding wire on the coil, can therefore potentially be at different wrapping positions on the core or coil.

The coils are divided into three coil groups or groups, denoted by "A, B, C" here, each having four coils. In particular, a group A contains the coils having the numbers "1, 2, 7, 8", a group B contains the coils having the numbers "3, 4, 9, 10" and a group C contains the coils having the numbers "5, 6, 11, 12". All the coils in one group are each connected in the form of an electrical series connection between two of the terminal regions in each case. The winding thereof therefore connects two different terminal regions and thus two different phases during operation. Therefore, in particular, the coils in group A are connected between the phases U and W and their terminal regions, the coils in group B are connected between the phases W and V, and the coils in group C are connected between the phases U and V. This thus results in a delta connection of the three groups, each having four coils, between the three terminal points and therefore the three phases of the three-phase voltage.

When viewed in the oriented circumferential direction with respect to the longitudinal axis (i.e. in the direction of increasing coil numbers) the three groups are arranged so as to be interleaved. This "interleaving" is to be understood as follows:

Each group contains exactly two pairs of adjacent coils in each case. One pair of each of the two other groups, i.e. four coils of the two other groups, is arranged between these two pairs. All the groups are constructed identically in terms of the sequence of their winding direction in the circumferential direction, in particular in the order CW-CCW-CCW-CW. Each pair of coils has both winding directions CW and CCW, and the order of the winding directions, again viewed in the oriented circumferential direction, differs between the two pairs of groups. Therefore, the following is applicable within one group: if the order is "CW-CCW" in the first pair, then it is "CCW-CW" in the second pair of the same group, and vice versa.

In the following, the technical winding start and the technical winding end of a relevant coil is again viewed with regard to the technical winding direction. In this sense, the winding start is the point at which the winding, e.g. the winding wire, first starts to form the coil during the winding process, in particular when it is first placed onto a core, or a winding or coil carrier of the coil. The winding end is the point at which the technical winding of the coil is ended, i.e. the winding wire is guided away from the coil again.

The technical winding start coming from one of the terminal regions is located in the first pair (which is first in the circumferential direction) of a group and on the second coil there.

At this point, it is positioned on the side of the second coil of the pair that is facing the first coil of this pair, i.e. "to the left" of the second coil. In this case, it is positioned on the end face of the coil, i.e. a particular end face of the winding pack; in the nomenclature selected here, it is secured to the "top" of the coil, i.e. to the upper end face of the winding pack. For all the groups, the end face is the same, fixed end face, i.e. here always the "upper" end face.

The following applies to the technical winding end leading to one of the terminal points: it is positioned on the second coil of this pair in the second pair of the relevant group, likewise at the "top" and likewise on that "left" side of the second coil in the pair, i.e. the side that is facing the first coil of this pair.

In particular if the coil group is uninterruptibly wound from a single conductor, the following is applicable: This is therefore the physical start of the winding or winding process in the technical winding direction of the first-wound coil in the relevant group which comes from the first terminal region, and the physical end of the winding of the last-wound coil in the relevant group that leads to the second terminal region. The relevant start and the end of the corresponding winding process are only selected or determined by way of example here.

The following is also applicable here: the determined winding direction is retained here for the purposes of explanation, even if this could also be reversed in an alternative variant for a coil group or winding, i.e. would run from the "end" to the "start", as referred to here.

As a result, the relevant winding direction of the coils is also reversed, i.e. "CCW" becomes "CW", and vice versa.

The invention is based on the following considerations: winding an electric motor or its stator with twelve coils (also "cores", "teeth", "slots"), in particular in conjunction with a 10-pole rotor, is a complex process which requires a skillful combination of design, process and manufacturing in order to reduce costs. The planning of a winding (winding pack), and also its wiring, i.e. the planning of an associated wiring unit ("busbars"), becomes more complex particularly for the 12/10 combination under discussion than for other configurations, due to the asymmetrical nature of this configuration. The complexity of the wiring unit or busbars results in relatively expensive components, relatively complex manufacturing, and the need for additional quality checks. Standard solutions for 12/10-pole motors that are conventional in practice use an asymmetrical winding pattern, which requires at least two different winding types for different phase groups (each having four coils). For example, using the nomenclature determined above, two phase groups are identically wound (coils 1, 2, 7, 8 and coils 5, 6, 11, 12 in CCW, CW, CW, CCW), but the third phase group is wound in the opposite winding direction (coils 3, 4, 9, 10 in CW, CCW, CCW, CW). This requires two different coil groups to be manufactured, and therefore more resources are required for the same production.

A solution of this kind has several drawbacks, such as the need to use a coil-winding machine; the retrofitted assembly of the respective coil groups to produce the stator is also very difficult to transfer to an automation process. Windings of this kind are therefore often produced partly by hand. Another solution is to divide the respective coil groups into two sub-groups, wind them with different wires, and subsequently connect the sub-groups to form the coil group. Although this solution simplifies the winding process and the handling, it significantly increases the complexity of the wiring unit or busbars, since the number of wire ends to be contacted is doubled. Furthermore, the wires or ends of the partial windings on the stator to be connected are offset by approx. 180° in the circumferential direction, which increases the length of the busbars required, e.g. contact rails/plates, and increases the number of layers in a wiring unit, since they often cannot be accommodated in the same layer due to a lack of space. The complexity of a corresponding soldering or welding process is also doubled.

The solution proposed here simplifies the coil connections, which results in a simplified wiring unit or busbars if the latter can be omitted not optionally, but even completely. In addition, this results in less complexity in the winding process. According to the proposed solution, all the coil groups or windings can be identically wound; the manufacturing time per winding is reduced, since all the coils or teeth can be wound at once and using the same winding pattern. This is particularly applicable to the embodiment set out below, since all the coils of a group are uninterruptibly wound with a single conductor. In particular, the winding can be carried out in the state of the winding pack or cores in which they are actually placed on a surface, as analogously described above. Coils "1-12" are then arranged in a row and are only rolled up, around the longitudinal axis, so to speak, to obtain the cylindrical winding pack after being wound to form a cylindrical assembly.

In the case of groups wound continuously with one conductor, this results in a total of just six lead wires (per two ends of the three conductors) which need to be contacted in the wiring unit. In this case, the solution proposed here makes it possible to interconnect each set of two adjacent lead wires three times in order to guide said wires to a common phase in each case. This especially simplifies the busbar design with the winding pack provided. In connection with the interleaving of the coil pairs, an almost even distribution of winding starts and winding ends of the windings also results over the circumference of the winding pack. This simplifies the contacting of the respective wire ends, since e.g. there is more space available for contact clamps ("hooks") between the conductor ends than in the case of wire ends that are very close to one another. By means of the winding ends and winding starts that are each placed centrally within a coil pair, quality assurance is also simplified.

In a preferred embodiment, all the feed portions, which each lead from the winding start or winding end to the terminal region, of the coil groups or the corresponding windings extend in a straight line in parallel with the longitudinal axis. As explained above, the "winding start/end" means the entry/exit points of the winding, e.g. of the conductor, into and out of the relevant coil, and not the relevant physical winding or conductor end. Owing to the arrangement of winding starts and ends, which is already rotationally symmetrical per se (as described above: "centrally" in the respective coil pairs in the circumferential direction), the feed portions leading away "upwards" in parallel with the longitudinal axis are therefore also rotationally symmetrical and are evenly distributed over the circumference so as to be offset from one another by 60° each time around the longitudinal axis. It is thus possible to position a wiring unit that is to be positioned and is likewise designed to be rotationally symmetrical with regard to the contacting of the wire ends in three different rotational positions. The rotational positions are each offset about the longitudinal axis by 120° in this case. The wiring unit (busbar) can in particular even be positioned in six different rotational positions, each rotated through 60°, and the connection is functional. This means that each position results in functioning wiring of the coil groups to form a delta connection. In all three or six rotational positions, the electrically functional connection of the winding pack is not changed. In this case, the feed portions do not have be changed and do not have to be deformed, or at most have to be minimally deformed.

In a preferred embodiment, in at least one group, all the feed portions of the windings, which lead from the winding start and winding end to the terminal regions, are on a first end face (at the "top" using the nomenclature selected here), and a connection line between the pairs is on the opposite second end face of the winding pack (therefore, the "bottom"). This simplifies both the positioning of a wiring unit and the installation or placement of the connection line in the form of the transitions between the pairs, in particular if the relevant group is wound with a single continuous conductor, e.g. a winding wire.

In a preferred embodiment, at least one, in particular both, pairs of at least one of, in particular all of, the coil groups are uninterruptibly wound with a single conductor. This alone simplifies the winding of the pair in question, since only a single uninterrupted winding process is required.

In a preferred variant of this embodiment, within at least one, preferably all, of the uninterruptibly wound pairs, the transition, i.e. the transition line, between the coils of a pair extends on the sides of said coils that face one another in the circumferential direction and is S-shaped here. The winding start on one coil and the winding end on the other coil are therefore positioned on sides of the respective coils facing one another, but at different end faces. The rounding of the winding on the core when it is removed from/positioned at this point results in the S shape. The S-shaped transition is mechanically particularly gentle for the conductor to be wound.

In a preferred variant of the above-mentioned embodiment, in at least one of, in particular all, the uninterruptibly wound first pairs, during the winding process, initially the second coil and then the first coil are wound and/or in at least one of, in particular all, the uninterruptibly wound second pairs, initially the first coil and then the second coil are wound. Here too, the technical winding direction is again discussed, i.e. the direction from the "start" to the "end" of the winding process. With the numbering explained above, the following coil orders are discussed, for example: 2-1/7-8/4-3/9-10/6-5/11-12. The winding pattern proposed above can thus be produced or implemented particularly advantageously.

In a preferred variant of the above-mentioned embodiment, at least one of, in particular all, the coil groups are each uninterruptibly wound with a single conductor. The conductor in particular forms the entire winding including the feed portions. Therefore, the winding of the entire coil group in question is simplified, since only a single uninterrupted winding process is required.

In a preferred variant of this embodiment, in at least one of, in particular all, the uninterruptibly wound coil groups, initially the first pair and then the second pair are wound in the above sense. In the technical winding direction discussed again, the particularly advantageous order 2-1-7-8/4-3-9-10/6-5-11-12 then results for the three groups of coils in conjunction with the preferred embodiment above.

In a preferred embodiment, the winding pack is one that is configured or intended for use in a 12/10-pole electric motor. As explained above, in this motor configuration, particularly great difficulties are known from practice; the proposed solution is particularly advantageous here and results in particularly significant simplifications and advantages.

The object of the invention is also achieved by a stator assembly according to claim 10. This assembly contains the winding pack proposed above and a wiring unit that is arranged or intended to be arranged on an end face, i.e. on an end face of the winding pack. The wiring unit contains three electrically conducting phase collectors ("busbars"), in particular electrical busbars or conductor rails, which are comparable in function to the above-mentioned connector rings. Each of the three phase collectors comprises one of three terminals, e.g. a plug contact, a screw contact, etc., for one of the three phases. When the stator assembly is being assembled or electrically wired up, each of three windings is to be electrically connected between two of the phase collectors in each case.

This means that, in the contacted or assembled state, a winding leads from each of the phase collectors to another of the phase collectors. Therefore, the groups or their windings are electrically connected to the terminals and the above-mentioned electrical delta connection is established. In particular, in this case, the feed portions of the winding are each electrically connected to one of the phase collectors.

The stator assembly and at least some of its possible embodiments, as well as the respective advantages, have already been analogously explained in connection with the winding pack according to the invention and the remarks on the wiring unit.

In a preferred embodiment, two winding starts and/or winding ends of the windings, which are each adjacent in the circumferential direction, are guided to one of the phase collectors in each case. This in particular means the ends of the feed portions. Whether the wiring of the two electrical conductors relates to two conductor starts, two conductor ends or one conductor start and one conductor end is decided by the terminal to be contacted in each case or the two relevant coil groups to be wired to this terminal. This provides the option of constructing the phase collectors to be comparatively small since they only have to interconnect adjacent ends of windings. This in particular provides the above-mentioned option of constructing the wiring unit to be rotationally symmetrical by 120°/60° in each case, such that it can be positioned in three/six rotational positions on the winding pack.

In a preferred variant of this embodiment, the winding start of the first group is electrically brought together with the winding end of the third group on the first phase collector, i.e. they are each brought into electrical contact here, such that they are ultimately connected to the terminal at this point. The winding starts of the second and third groups are accordingly electrically brought together on the second phase collector or terminal, and the winding ends of the first and second groups are electrically brought together on the third phase collector. This results in a particularly advantageous and simple wiring of the three coil groups.

In a preferred embodiment, the wiring unit is designed to be rotationally symmetrical by 120°, in particular 60°, in terms of being fitted to one of the end faces of the winding pack. This does not necessarily relate to the rotational symmetry of the entire wiring unit, but instead only to its mechanical and electrical interface with respect to the winding head, i.e. purely how it is fitted thereto, so as to be connected to the resulting electrical wiring of the windings resulting in each case. By all means, the wiring unit itself may not be designed to be rotationally symmetrical here, for example due to an asymmetrical arrangement of the terminals. This in particular provides advantages when mounting the wiring unit on the winding pack, since at least three or six mounting positions are possible here.

In a preferred embodiment, the phase collectors are designed identically, possibly with the exception of the terminals. A basic design for a corresponding phase collector (i.e. possibly with the exception of the terminals) therefore only has to be found once and can be used for all three phase collectors in the wiring unit.

BRIEF DESCRIPTION OF THE DRAWING

Further features, effects and advantages of the invention will become apparent from the following description of a preferred example embodiment of the invention and the accompanying drawings, in which, schematically in each case.

DETAILED DESCRIPTION OF THE INVENTION

Figure 1:
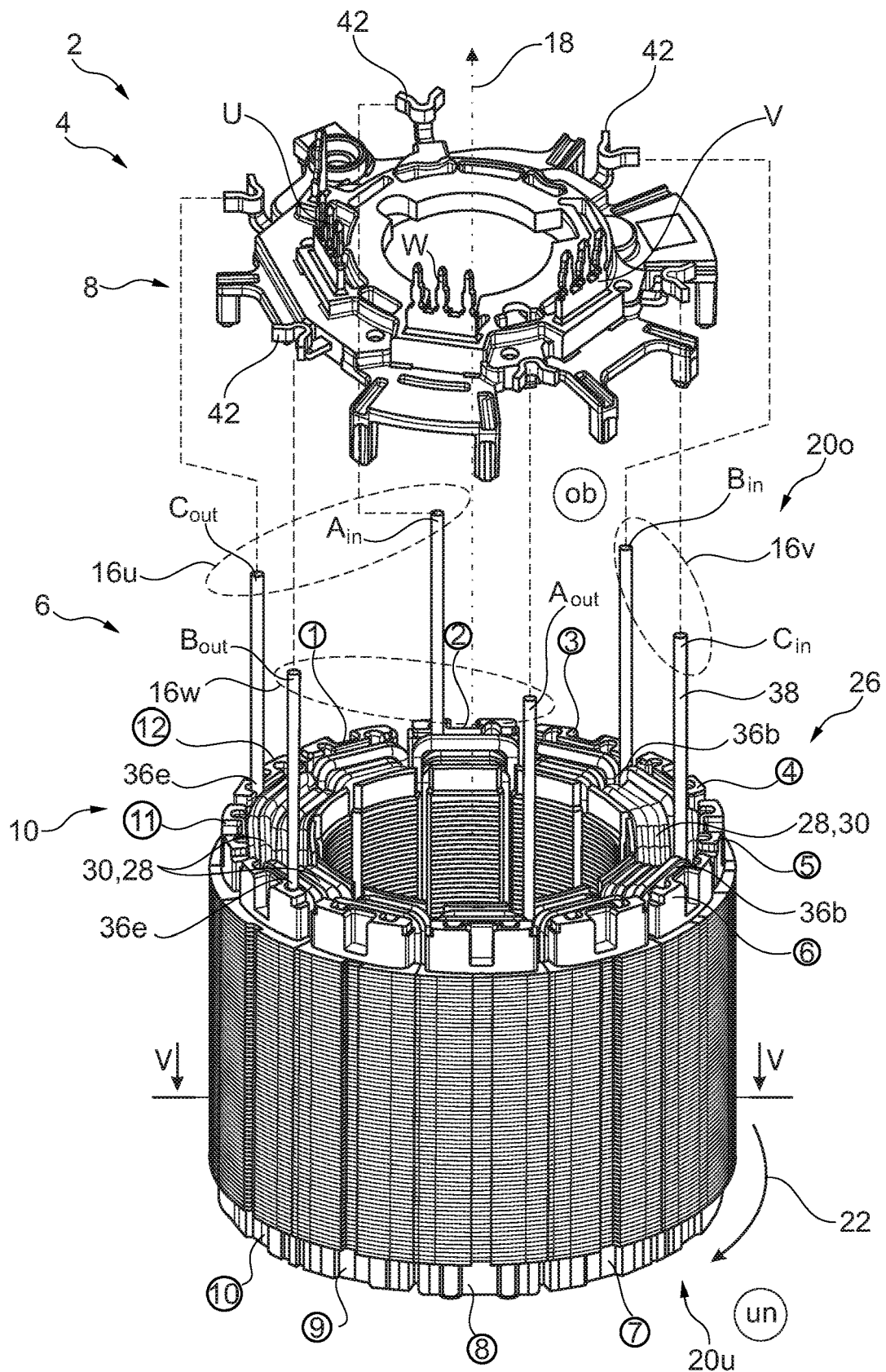
FIG. 1 is a perspective oblique view of a stator of an electric motor, with the wiring unit not yet installed.

FIG. 1 shows a stator 2 of an electric motor (not shown in greater detail), which is still in a disassembled state. In the present case, the electric motor is what is known as a 12/10 electric motor, i.e. the stator thereof comprises twelve poles, teeth or coils 28 distributed over its circumference on cores 12, and the rotor thereof (not shown) comprises ten poles distributed over the circumference in the form of ten permanent magnets.

The stator 2 contains a stator assembly 4. The stator assembly 4 has a winding pack 6 and a wiring unit 8. In the disassembled state shown, the wiring unit 8 has not yet been positioned on the rest of the stator 2 or connected thereto and brought into contact therewith. In this case, the winding pack 6 is attached to a core assembly 10, which is not explained in greater detail here. Said core assembly has cores 12, in the form of individual cores here. In this case, on its coil carrier 14, each core 12 supports a coil 28 or the relevant part of the winding 30 (see also FIG. 5).

The winding pack 6 comprises three imaginary terminal regions 16*u, v, w*, which are therefore only indicated by dashed lines here. In each of these terminal regions 16*u, v, w*, the winding pack 6 can be connected to one phase U, V, W of a three-phase voltage in each case. As explained below, this takes place by interposing a phase collector 44*u, v, w*.

The winding pack 6 has a longitudinal axis 18, which, in this case, is assigned a direction, namely from the "bottom" un to the "top" ob. The winding pack 6 therefore comprises a lower end face 20*u* and an upper end face 20*o*. The longitudinal axis 18 is also assigned an oriented circumferential direction 22. This assignment takes place in the clockwise direction when viewed from the "top" ob looking down onto the winding pack 6.

The winding pack 6 contains a coil assembly 26, again containing twelve coils 28 which are evenly distributed around the longitudinal axis 18 in the circumferential direction 22 and are numbered with "1" to "12" within circles in the circumferential direction 22 for the sake of clarity. "Evenly distributed" means that each of the coils 28 encloses a circumferential angle of 30° around the longitudinal axis 18. All the coils 28 have an identical winding geometry, except for a potentially different winding direction (CW: clockwise or CCW: counterclockwise).

Figure 3:
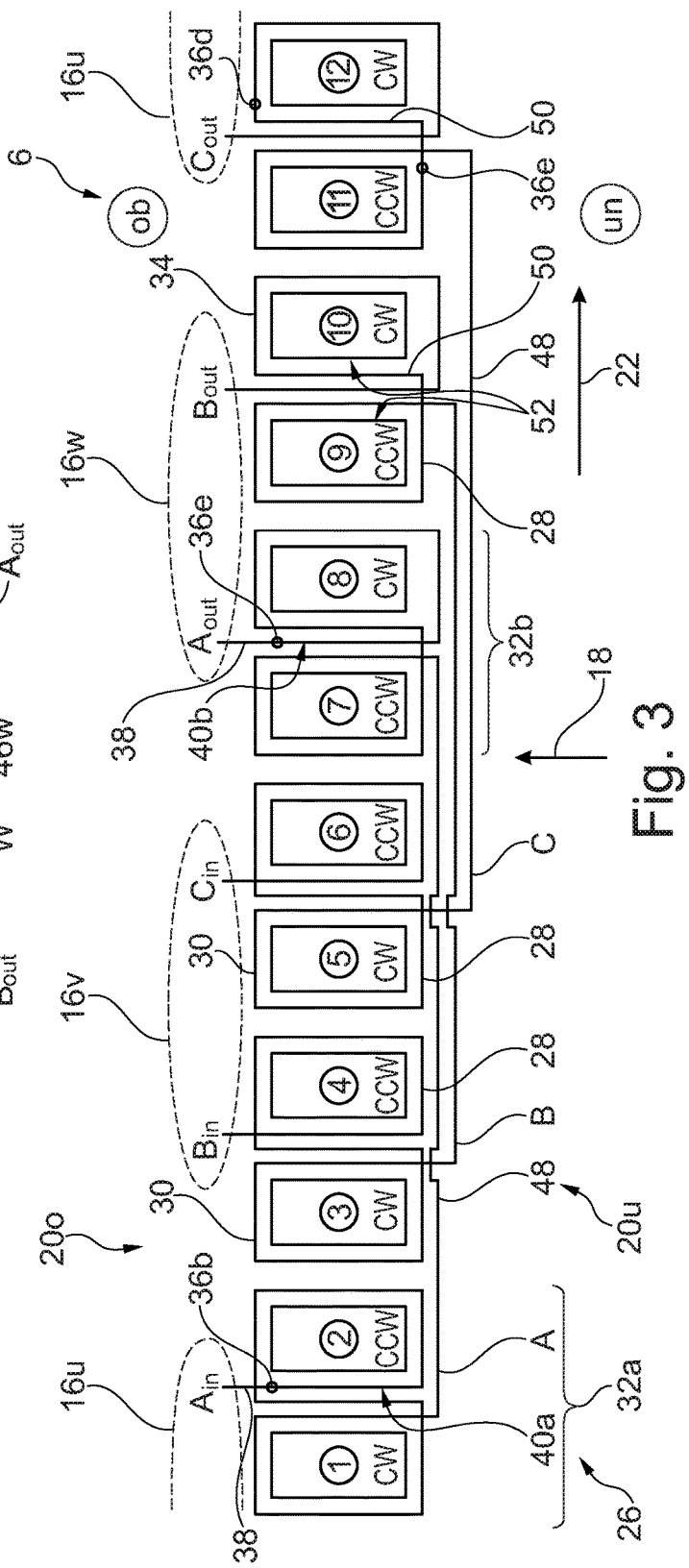
FIG. 3 shows a winding pattern for the winding pack from FIG. 1.

FIG. 3 shows the winding pattern of the winding pack 6. In this figure, the winding pack 6 has been unraveled between the coils 28 having the numbers "12" and "1" and laid out on the plane of the paper by its radial outer face. The radial inner face is therefore facing the viewer. The circumferential direction 22 therefore forms a straight line extending from left to right here. The orientation of the longitudinal axis 18 is represented by the designations bottom un and top ob.

The twelve coils 28 are divided into three groups A, B, C, each having four coils 28. All four coils 28 of each of the groups A, B, C are designed in the form of an electrical series connection in the relevant winding 30. In this case, the series connection or winding 30 is connected between two of the terminal regions 16u, v, w in each case. In the figure, the groups are denoted by the designation of their relevant conductor 34 or the relevant connection line 48 (see below).

The groups A, B, C are arranged so as to be interleaved in the circumferential direction 22 as follows:

Each group A, B, C comprises a first pair 32a viewed in this direction and a second pair 32b of coils 28 which are each adjacent. For group A, the first pair 32a is formed by the coils "1" and "2" and the second pair 32b is formed by the coils "7" and "8". For group B, they are accordingly the coils "3", "4" and "9", "10", and for group C they are the coils "5", "6" and "11", "12". Between each of the pairs 32a and 32b of each of groups A, B, C, a pair 32a or 32b of the two other groups A, B, C is arranged. Therefore, the first pair 32a of group C and the second pair 32b of group A are arranged between the pairs 32a and 32b of group B, for example.

All the groups A, B, C are constructed identically in terms of the sequence of their winding direction CW, CCW in the circumferential direction 22, in this case CW-CCW-CCW-CW. In addition, each pair 32a, b has both winding directions CW and CCW and the order of the winding directions CW, CCW in the circumferential direction 22 is reversed between each of the pairs 32a, b, i.e., in this case, CW-CCW in the first pair 32a and CCW-CW in the second pair 32b.

Each of the coils 28 has a technical winding start 36b and a technical winding end 36e. The winding start 36b is the position on the relevant coil 28 at which the conductor 34 is first placed onto the coil 28 or the relevant core 12 or coil carrier 14 during the winding process. The winding end 36e is the position at which the conductor 34 is led away from the coil 28. In particular in the present case, in which each of the groups A, B, C is uninterruptibly wound with a single continuous conductor 34, the winding start 36b on the first coil (e.g. the coil "2" for group A) also forms the winding start 36b of the entire group A, B, C in question, and the winding end 36e of the last wound coil (e.g. "8" for group A) forms the entire winding end 36e of said coil. A relevant feed portion 38 leads from the relevant winding start 36b and end 36e to the relevant terminal region 16u, v, w.

The technical winding start 36b coming from one of the terminal regions 16u, v, w in the first pair 36a of the relevant group A, B, C is located at the top "ob" in the circumferential direction 22, i.e. on the upper end face 20o of the winding pack 6. It is located on the side 40a of the second coil 28 "2", "4", "6", which is technically wound first but is second in the circumferential direction, in the first pair 32a, which coil is facing the other coil 28 in this pair 32a "1", "3", "5". For group A, this is the side 40a of the coil 28 "2" that is facing the coil 28 "1".

The technical winding end 36e leading to one of the terminal regions 16u, v, w of the relevant group A, B, C, however, is likewise located, in the second pair 32b ("8", "10", "12") of the relevant group A, B, C, when viewed in the circumferential direction 22, at the "top" on the side 40b of the relevant second coil 28 of the second pair 32b facing the first coil 28 ("7", "9", "11") of this pair 32b. For group A, this is the side 40b of the coil 28 "8" that is facing the coil 28 "7".

In order to illustrate the technical winding direction of the respective groups A, B, C or windings 30, the ends thereof are each denoted by "Ain, Bin, Cin" as the technical winding start and "Aout, Bout, Cout" as the technical winding end.

It can be seen from FIG. 3 that three completely identically wound groups A, B, C of coils 28 thus result. It can also be seen from FIG. 1 that the respective winding starts 36b and winding ends 36e of the respective groups A, B, C are evenly distributed in the circumferential direction 22, i.e. are each arranged so as to be offset from one another by 60°. This in turn makes it possible, in particular in conjunction with the feed portions 38 extending in parallel with the longitudinal axis 18, for the respective contact points 42 of the wiring unit 8 to be rotationally symmetrically distributed for connecting the windings 30 or feed portions 38 in the respective terminal regions 16u, v, w. Here, the contact points 42 are designed as clamps for the winding wire in the form of the conductor 34.

Figure 2:
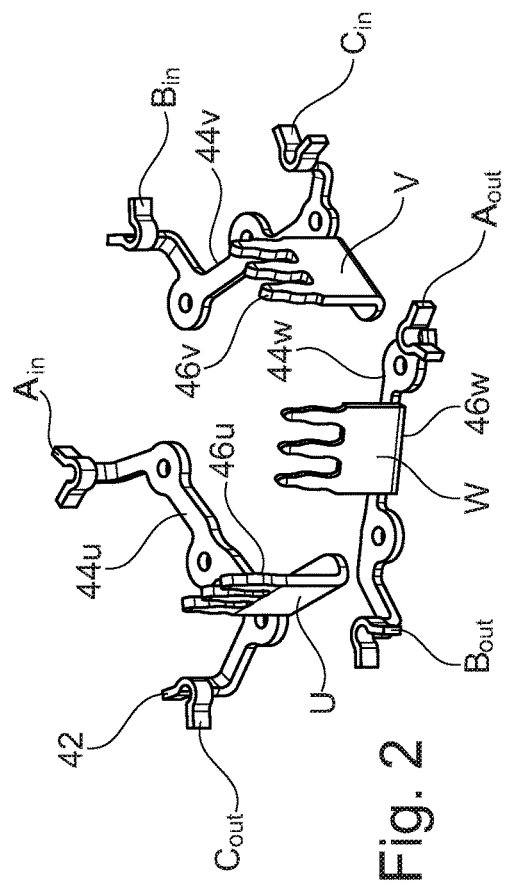
FIG. 2 shows the three phase collectors of the wiring unit from FIG. 1.

FIG. 2 shows the internal electrical construction of the wiring unit 8 by omitting its housing or potting compound, which is shown in FIG. 1 but is not described in greater detail. This figure therefore only shows three phase collectors 44u, v, w, which each comprise two of the contact points 42 in order to bring the groups A, B, C into contact with the terminal regions 16u, v, w, as described above. The phase collectors 44u, v, w are designed as conductor rails ("busbars") here. The above-described rotationally symmetrical construction of the winding pack 6 makes it possible to identically design the phase collectors 44u, v, w per se, with just one terminal 46u, v, w being arranged differently on the phase collectors 44u, v, w for one of the phases U, V, W in each case.

The basic form thereof is identical, however. It can also be seen that, when the housing of the wiring unit 8 is accordingly designed to be rotationally symmetrical, it can be positioned on the winding pack 6 in three rotational positions, each offset by 120° or 60°, around the longitudinal axis 18 without the electrical wiring of the winding pack 6 needing to be changed. The wiring unit 8 is therefore designed to be rotationally symmetrical by 120° in terms of being fitted to the end face 20o of the winding pack 6.

It can be seen from FIG. 1 that this is in particular also applicable if the feed portions 38 leading from the relevant winding start 36b or end 36e to the terminal regions 16u, v, w extend in a straight line and in parallel with the longitudinal axis 18.

It can be seen from FIGS. 1 and 3 that, in all the groups A, B, C, the feed portions 38 leading from the winding start 36b or end 36e to the terminal regions 16u, v, w are positioned on a first end face 20o, here the upper end face, of the winding pack 6. The relevant connection line 48 between the pairs 32a, b is positioned on the second end face 20u of the winding pack 6, here the lower end face opposite the first end face.

In the present example, not only the respective pairs 32a, b of the coil groups A, B, C are uninterruptibly wound with a single conductor 34, but the entire winding 30 including all the pairs and the feed portions 38 is uninterruptibly wound with a single conductor 34. In this case, within all the uninterruptibly wound pairs 32a, b here, the relevant transition line 50 of the winding 30 or conductor 34 extends between the coils 28 on the sides 52 of these coils 28 that face one another and is S-shaped here. This is produced by reversing the winding direction. This is illustrated in FIG. 3 by way of example for the coils 28 "11" and "12": the transition line 50 has an S shape between the winding end 36e of the coil 28 "11" and the winding start 36b of the coil 28 "12".

In the respective first pairs 32a, when viewed in the circumferential direction 22, initially the second coils 28 and then the first coils are wound (e.g. order of "2"-"1" in group A). In the respective second pairs 32b, however, when each viewed in the circumferential direction 22, initially the first coils 28 and then the second coils are wound (e.g. order of "7"-"8" in group A). In addition, in all the coil groups A, B, C, initially the first pair 32a and then the second pair 32b are wound.

Based on the arrangement of the coil groups A, B, C in the circumferential direction 22, the winding start 36b of the first group A is brought together with the winding end 36e of the third group C on the first phase collector 44u and they are brought into electrical contact therewith. The winding start 36b of the second group B and the third group C are brought together at the second phase collector 44v; the winding ends 36e of the first group A and the second group B are brought together at the third phase collector 44w. The same can in particular be understood from the designations Ain, Bin, Cin and Aout, Bout, Cout.

Figure 4:
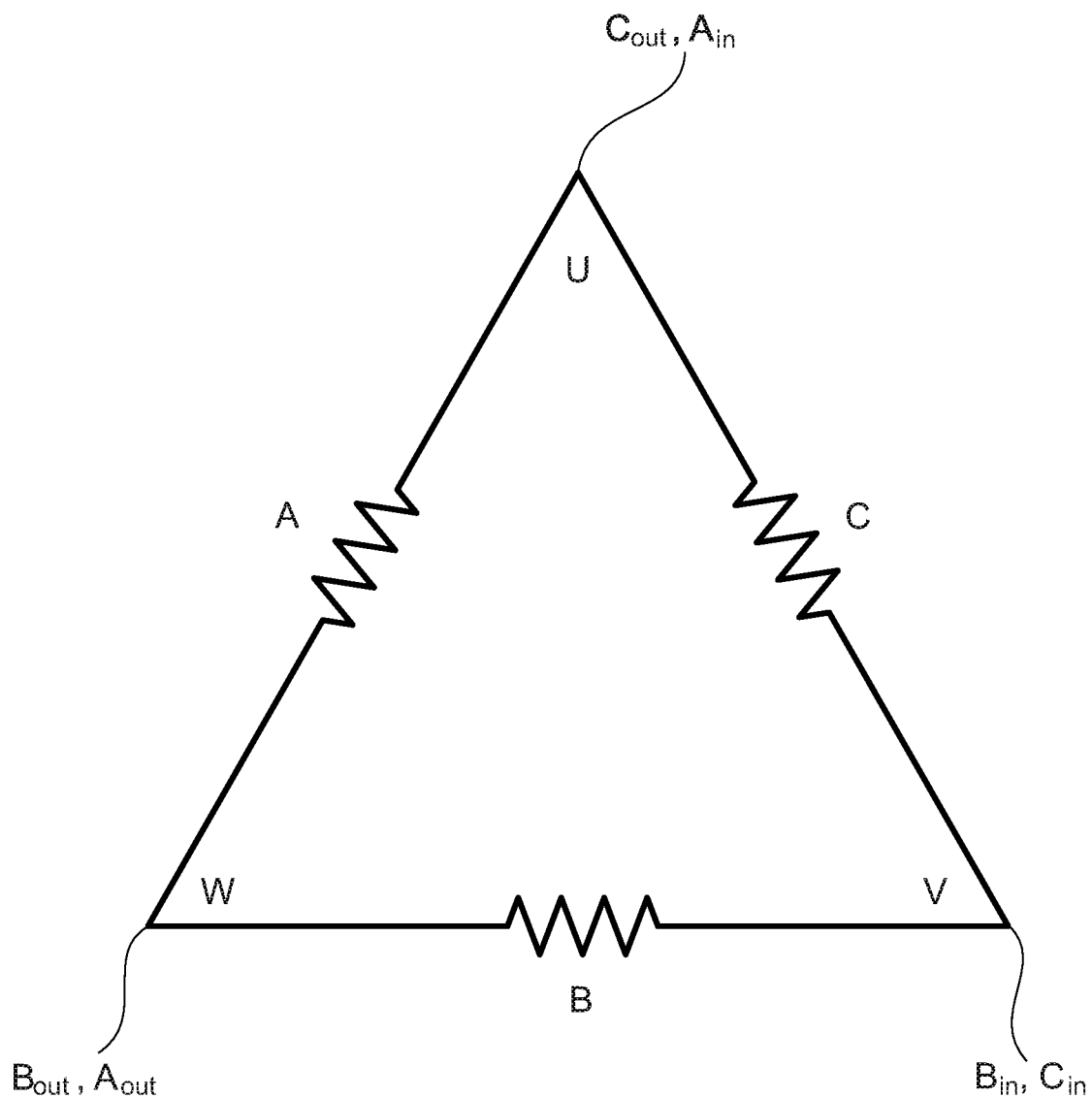
FIG. 4 shows the electrical connection of the stator to a three-phase voltage.

FIG. 4 is a schematic electrical circuit diagram of the wiring of the coil groups A, B, C and the winding starts Ain, Bin, Cin and winding ends Aout, Bout, Cout thereof to the phases U, V, W. The terminal regions 16u, v, w, in which the wiring of the groups A, B, C to the phases U, V, W takes place, are again represented.

Figure 5:
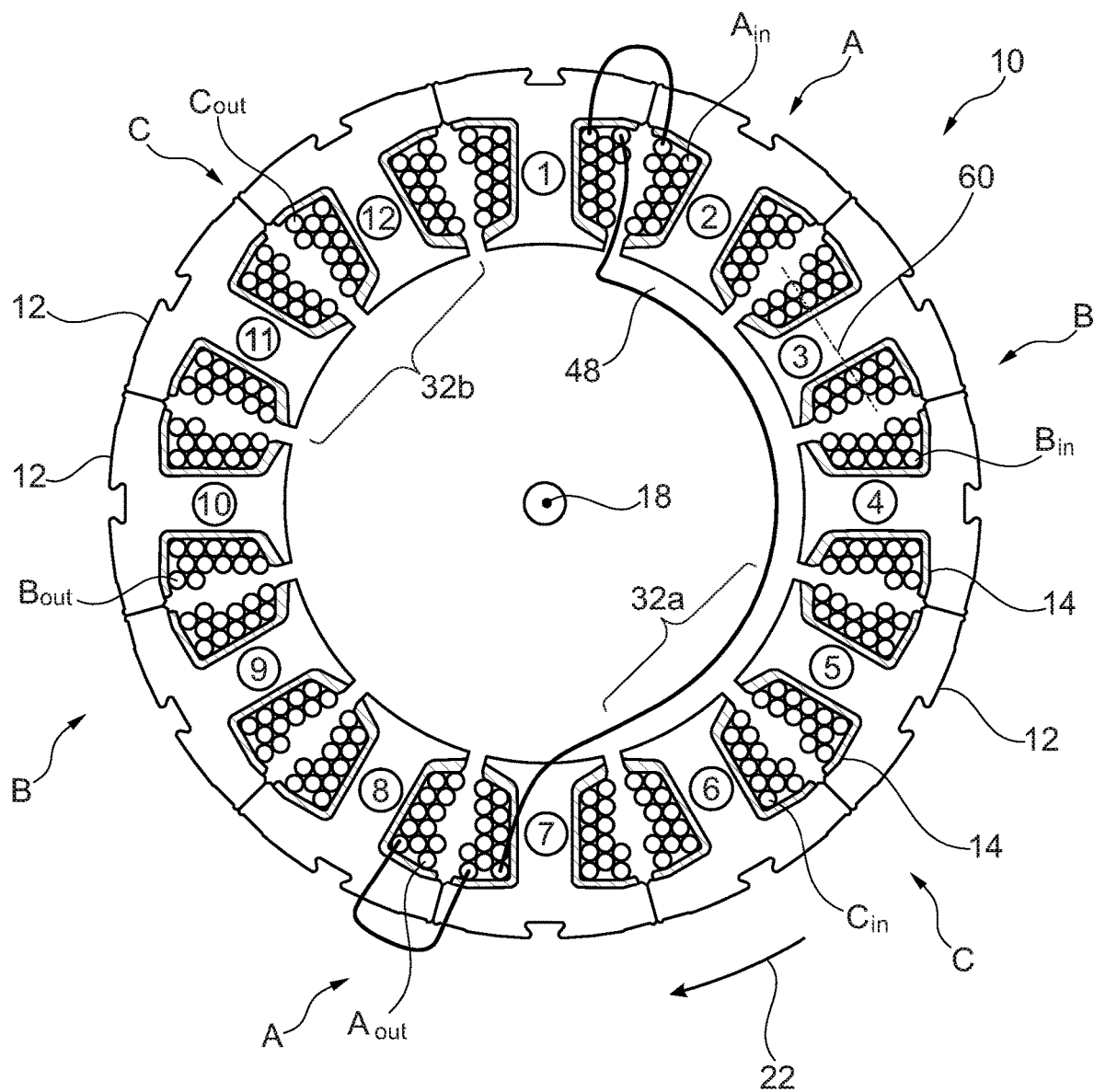
FIG. 5 is a plan view of a cross section through the stator from FIG. 1.

FIG. 5 is a section along the transverse plane V-V in the viewing direction of the indicated arrows through FIG. 1, i.e. in a plan view from the "top". The respective windings of the coils 28 "1" to "12" can be seen. The windings are each attached to a core 12. The respective feed portions 38 from the winding starts Ain, Bin, Cin of the coil groups A, B, C and to the winding ends Aout, Bout, Cout are represented. For group A, in addition, the transition lines 50 within the pairs 32a, b and the connection line 48 between the pairs are represented.

FIG. 5 also shows how each of the coils 28 and the windings thereof delimit a surface 60 indicated by a dashed line. For all the coils 28, the surface normal of the surface 60 points in the radial direction relative to the longitudinal axis 18. In this sense, all the coils 28 are oriented concentrically in the circumferential direction with respect to the longitudinal axis 18 and have the same radial spacing from the longitudinal axis 18, and are therefore distributed around the longitudinal axis 18 on a concentric circle or cylinder.

LIST OF REFERENCE SIGNS

2 Stator
4 Stator assembly
6 Winding pack
8 Wiring unit
10 Core assembly
12 Core
14 Coil carrier
16u, v, w Terminal region
18 Longitudinal axis
20u, o End face (bottom, top)
22 Circumferential direction
26 Coil assembly
28 Coil
30 Winding
32a, b Pair (first, second)
34 Conductor
36b Winding start (technical)
36e Winding end (technical)
38 Feed portions
40a, b Side
42 Contact point
44u, v, w Phase collector
46u, v, w Terminal
48 Connection line
50 Transition line
52 Side (facing one another)
60 Surface
U, V, W Phase of a three-phase voltage
un Bottom
ob Top
A, B, C Group
CW, CCW Winding direction (clockwise/counterclockwise)
Ain, Bin, Cin Winding start of the group (technical)
Aou, Bou, Cout Winding end of the group (technical)

The invention claimed is:

1. A winding pack for a stator assembly of an electric motor,
comprising three terminal regions each for one phase of a three-phase voltage,
comprising a coil assembly, which is concentric with a longitudinal axis of the winding pack and contains twelve coils evenly distributed in the circumferential direction around the longitudinal axis,
wherein all the coils comprise a winding geometry that is identical except for the respective winding directions,
wherein the winding pack comprises three windings,
wherein the coils are divided into three groups, each having four coils of a winding, and all the coils in each group are each connected in the form of an electrical series connection between two of the terminal regions in each case,
wherein the three groups are arranged so as to be interleaved in the circumferential direction such that:
each group contains exactly a first pair and a second pair of adjacent coils and one pair of each of the two other groups is arranged between these two pairs, and such that
all the groups are constructed identically in terms of the sequence of their winding direction in the circumferential direction, and such that
each pair comprises both winding directions and the order of the winding directions between the two pairs of the group differs in the circumferential direction,
wherein the technical winding start coming from one of the terminal regions in the first pair of adjacent coils that is first when viewed in the circumferential direction is located at an end face and on the side of the second coil of the first pair facing the first coil of the first pair, and
wherein the technical winding end leading to one of the terminal regions in the second pair of adjacent coils of the group is located at an end face and on the side of the second coil of the pair facing the first coil of the second pair.

2. The winding pack according to claim 1, wherein all the feed portions, which each lead from the winding start or winding end to the terminal region, of the coil groups extend in a straight line in parallel with the longitudinal axis.

3. The winding pack according to claim 1, wherein in at least one group, all the feed portions, which lead from the winding start and winding end to the terminal regions, of the windings are on a first end face, and a connection line between the pairs is on an opposite second end face of the winding pack.

4. The winding pack according to claim 1, wherein at least one pair of at least one of the coil groups is uninterruptibly wound with a single conductor.

5. The winding pack according to claim 4, wherein within at least one of the uninterruptibly wound pairs, the transition line between the coils of a pair extends on the sides of said coils that face one another in the circumferential direction and is S-shaped here.

6. The winding pack according to claim 4, wherein in at least one of the uninterruptibly wound first pairs, initially the second coil and then the first coil are wound in the circumferential direction and/or in at least one of the uninterruptibly wound second pairs, initially the first coil and then the second coil are wound.

7. The winding pack according to claim 4, wherein at least one of the coil groups is uninterruptibly wound with a single conductor.

8. The winding pack according to claim 7, wherein in at least one of the uninterruptibly wound coil groups, initially the first pair and then the second pair are wound.

9. The winding pack according to claim 1, wherein the winding pack is one that is configured for use in a 12/10-pole electric motor.

10. A stator assembly, comprising: the winding pack according to claim 1; and a wiring unit, arranged on the end face thereof, comprising three phase collectors, each of the phase collectors comprising one of three terminals for one of the three phases, each winding being intended to be electrically connected between two of the phase collectors in each case.

11. The stator assembly according to claim 10, wherein two winding starts and/or winding ends of the windings, which are each adjacent in the circumferential direction, are guided to one of the phase collectors in each case.

12. The stator assembly according to claim 11, wherein the winding start of the first group and the winding end of the third group are electrically brought together at the first phase collector, the winding start of the second group and the third group are electrically brought together at the second phase collector, and the winding ends of the first group and the second group are electrically brought together at the third phase collector.

13. The stator assembly according to claim 11, wherein the phase collectors are designed identically.

14. The stator assembly according to claim 10, wherein the wiring unit is designed to be rotationally symmetrical by either 120° or 60° in terms of being fitted to one of the end faces of the winding pack.

* * * * *